United States Patent Office 3,240,605
Patented Mar. 15, 1966

3,240,605
GROWTH PROMOTANT SUBSTANCES
Marvin Legator, Modesto, Calif., assignor to Shell Oil Company, New York, N.Y., a corporation of Delaware
No Drawing. Filed June 28, 1961, Ser. No. 120,185
14 Claims. (Cl. 99—2)

This invention relates to growth promotant substances for animals and more particularly, to growth promotant substances which are of particular value in promoting the growth of domestic and farm animals. These growth promotant substances are especially useful for promoting the growth of livestock such as lambs, cattle, horses, and swine, as well as for promoting the growth of poultry such as chickens, turkeys and ducks.

In recent years a few substances have been found to have the property of promoting or stimulating animal growth, although these substances are apparently not a normal nutritional requirement of the animal. Perhaps the best established of these substances are certain growth stimulating antibiotics such as, for example, bacitracin, erythromycin, chloramphenicol or terramycin. In addition, as reported in the literature in this field, there have been experimental indications that other non-nutritional substances, principally surfactants, under some conditions may also stimulate growth, although not to the extent of or as reliably as the aforementioned antibiotics. However, as the animal-raising art stands at present, only certain antibiotics have been accepted generally as additives to animal feeds, while surfactants have not been felt to be of sufficient value to justify their use in commercial feeding operations. In addition, it is known that certain antibiotics are responsible for the development of resistant organisms within the host animal and thus further complicate the animals' normal growth cycle. There is still a considerable need for more effective and less expensive animal growth promotants.

Since 1949, antimicrobial compounds, specifically antibiotics, have been evaluated as animal feed or animal nutrient supplements. The benefits derived from medicated feed include, for example, increased growth rate, increased efficiency in feed utilization, increased bloom and appearance of the animal (carcass grade), control of certain nonspecific diseases (scours and enteritis), and reduction in the number of runts.

It is, therefore, a general object of this invention to provide animal feeds or animal nutrient materials containing novel growth promotant substances which compare favorably with the currently employed antibiotics both as to cost and results obtained.

A further general object is to provide animal feed or nutrient material containing these growth promotant substances which are in many cases superior to the antibiotics currently employed for this purpose and which will accomplish the above-indicated benefits derived from medicated feed.

A specific object is to provide growth stimulation in farm animals by introducing into the animals water or the nutrient material to be consumed by the animal, an active antimicrobial compound within the purview of this invention.

A still further specific object is the oral administration of antimicrobial compounds of the present invention to living animals in order to stimulate, accelerate or promote the growth of the animal.

Other objects and advantages will appear as the specification proceeds to those skilled in the art to which this invention pertains.

It has now been discovered that the above-indicated objects and benefits can be accomplished by providing as novel growth promotants, alpha,beta-olefinically unsaturated aliphatic aldehydes and derivatives thereof. More specifically, these growth promotants are: (1) alpha,beta-olefinically unsaturated aliphatic aldehydes; (2) the dialiphatic acetals of (1); and (3) the beta-aliphaticoxyaldehydes derived from (1). These compounds are set forth in more detail as follows:

(1) Alpha,beta-olefinically unsaturated aliphatic aldehydes, especially the alpha-methylidene alkanals represented by the following general formula:

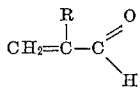

wherein R can be hydrogen or an unsubstituted straight-chain alkyl radical of 1 to 5 carbon atoms. The preferred alpha-methylidene alkanal of the present invention, as evidenced by tests conducted in living animals, is acrolein—that is, wherein R is hydrogen in the above formula. Another compound of considerable value is methacrolein—that is, wherein R is a methyl group in the above formula.

(2) Alpha,beta-alkenal dialiphatic acetals, especially acrolein dialiphatic acetals represented by the following general formula:

$$CH_2=CHCH(OR)_2$$

wherein R is an aliphatic group, preferably alkyl, either straight or branched chain, ranging from 1 to not more than 10 carbon atoms. Most preferably, the group R contains from 1 to 5 carbon atoms, and the unsubstituted straight-chain dialkyl acetals are most desirable. A preferred dialkyl acetal of the present invention is acrolein dimethyl acetal, as evidenced by tests conducted in living animals. Other desirable species are acrolein diethyl acetal, acrolein dipropyl acetal and acrolein dibutyl acetal. Specific other examples of suitable acrolein diacetals are acrolein diisopropyl acetal; acrolein di(2-butenyl) acetal; acrolein di(3-heptenyl) acetal; acrolein diheptyl acetal; and acrolein didecyl acetal. Also, the corresponding methacrolein dihydrocarbyl acetals are useful; and (3) Beta-aliphaticoxyaldehydes represented by the following structural formula:

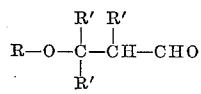

wherein R represents an aliphatic group, preferably a cycloalkyl or straight-chain alkyl group of 1–10 carbon atoms, either saturated or unsaturated, and each R' represents a hydrogen atom or an aliphatic group, preferably a straight-chain lower alkyl group of 1 to 5 carbon atoms. Specific examples of beta-aliphaticoxyaldehydes encompassed by the present invention are: beta-allyloxypropionaldehyde; beta - methoxypropionaldehyde; beta-ethoxypropionaldehyde; beta - decyloxy-alpha-methylpropionaldehyde; beta - pentyloxy-alpha-pentylpropionaldehyde; beta - methallyloxypropionaldehyde; beta-allyloxybutyraldehyde; beta - ethoxycaprylaldehyde; beta-pentyloxy - beta - methylbutyraldehyde; beta-chloromethoxypropionaldehyde; and beta-nitromethoxypropionaldehyde. The preferred beta-aliphaticoxyaldehydes are the unsubstituted beta-alkoxyaldehydes. Of these, the beta-alkoxypropionaldehydes are most preferred, such as, for example, beta - methoxypropionaldehyde; beta-ethoxypropionaldehyde; beta-propoxypropionaldehyde; beta-butoxypropionaldehyde; and the like, in which the alkyl portion of the alkoxy group is an unsubstituted straight-chain alkyl of 1 to 10 carbon atoms. An especially preferred unsubstituted beta-alkoxypropionaldehyde is beta-methoxypropionaldehyde, as shown by tests conducted in living animals.

The alpha,beta-olefinically unsaturated aliphatic aldehydes and alpha,beta-alkenal dialiphatic acetals encompassed herein are known compounds and can be prepared according to well-known methods. The beta-aliphaticoxy-aldehydes are also known and can be prepared by reacting an appropriate olefinic aliphatic aldehyde, especially an alpha,beta-unsaturated aldehyde, with an alcohol in the presence of a catalyst. For example, beta-alkyloxy-propionaldehyde may be prepared by treating allyl alcohol with acrolein.

All of the above groups of compounds are chemically related to each other in that they are all alpha,beta-olefinically unsaturated aliphatic aldehydes or derivatives thereof, and all have a community of utility in that they possess growth promotant ability in animals Representative growth promotant compounds encompassed by the present invention which have shown a broad spectrum of in vitro activity against certain bacteria are: acrolein, acrolein dimethyl acetal and beta-methoxypropionaldehyde. These compounds are effective against bacteria at concentrations in the range of the currently employed antibiotics such as the tetracyclines and chloramphenicol. In addition to their in vitro activity against certain bacteria, these compounds have been evaluated in vivo in living animals, e.g., lambs, and have shown growth stimulation equal or superior to the antibiotic standard employed. These growth promotant compounds are mixed with standard feed or where feasible added directly to the drinking water.

The following representative examples illustrate the growth promotant ability in farm animals of typical compounds within the purview of this invention. These examples more fully illustrate the invention by describing tests with animal feed, nutrient material, or drinking water characterized by containing as an essential active ingredient therein at least one compound from the alpha, beta-olefinically unsaturated aldehydes and derivatives thereof encompassed by this invention.

EXAMPLE I.—FOUR WEEK-SIX WEEK-EIGHT WEEK GROWTH PROMOTANT RESULTS IN LAMBS

Table I illustrates growth stimulation in lambs with typical compounds of the present invention. These growth stimulants were in each case orally administered to the lambs by mixing the promotant with the feed or, in the case of acrolein, adding it to the drinking water daily. Ten lambs were used per treatment with the exception of the check and the aureomycin standard where eight lambs were used. The lambs at the start of the test weighed about 80 pounds each and were from about 4 to 5 months old.

*Table I.—Four week-six week-eight week results*

| Compound | Quantity Per Lamb Per Day in Feed or Water, mg. | Lb. Gain Per Animal Per Day at— | | | Pounds Feed Consumed Per Pound Gain (Feed Conversion Ratio) |
| --- | --- | --- | --- | --- | --- |
| | | 4 Wks. | 6 Wks. | 8 Wks. | |
| Acrolein | 100 | .43 | .36 | .36 | 10.5 |
| Acrolein dimethyl acetal | 50 | .35 | .35 | .36 | 11.4 |
| Beta-methoxypropion-aldehyde | 50 | .30 | .41 | .42 | 10.2 |
| Aureomycin | 25 | .43 | .39 | .37 | 11.4 |
| Check | | .21 | .26 | .29 | 12.0 |

It can be seen from Table I, that the weight gain per animal was fairly constant for the eight-week period. This is in contrast to aureomycin where the weight gain decreased after the first four weeks.

Acrolein and aureomycin were similar in results. The decrease in the rate of weight gain on treatment with antibiotics, such as shown, is attributed to the establishment of a resistant flora after prolonged use. The evidence currently available seems to indicate that the growth promotants of this invention are not beset with this problem. The reason for a similar decline in rate with acrolein after the fourth week is not definitely known, but believed to be attributed to the loss of acrolein from the water trough by vaporization so that the consumption was actually less than indicated. The results with acrolein are complicated by variations in the amount consumed by the animals. Although acrolein was added fresh daily to the water trough, the rate of loss from the water varied with conditions. On a day when the temperature reached 100° F. in the late afternoon, it was initially found, by chemical analysis, that there was 22 p.p.m. in the water trough at 8:30 a.m., but only 12 p.p.m. at 4:00 p.m.

Acrolein dimethyl acetal was the poorest of the materials evaluated in this test but nevertheless about equal to the aureomycin standard.

Although beta-methoxypropionaldehyde at the four-week weighing showed very little increase over a normally anticipated gain of .30–.35 lb. per day, a sharp increase in weight gain occurred between the fourth and sixth week weighing, placing this compound first in this particular test.

There were no appreciable differences in the grade of the carcasses from any of the treatments, and all appeared slightly better than the checks. From Table I, it can be seen that all the test materials were equal or superior to the aureomycin standard in both weight gain and feed conversion ration.

EXAMPLE II.—SIXTY-DAY GROWTH PROMOTANT RESULTS IN LAMBS

This example is to show the result of tests with lambs using beta-methoxypropionaldehyde as growth promotant. Beta-methoxypropionaldehyde was blended into a standard feed and fed throughout a 60-day test period at a dosage of 50 and 100 mg./lamb/day. Aureomycin was the standard at 25 mg./lamb/day. Ten feeder lambs weighing about 80 pounds each were used for each treatment.

An effective treatment was obtained with beta-methoxypropionaldehyde at 100 mg./lamb/day. This compound increased daily weight gain about 33% over the untreated controls and was equal to or slightly better than the aureomycin standard.

Beta-methoxypropionaldehye was effective in increasing weight gain at the best dosage comparable to the antibiotic standard.

In practicing this invention, the growth promotant substances described herein are orally administered to the growing animal. It is relatively easy to practice the invention by incorporating the compounds in any suitable animal feed or nutrient material which will be consumed by the animal or, if possible, by adding it directly to the animals' drinking water. In this way it has been found possible to increase the weight gain and feed conversion ratio in animals, as shown herein.

The feed or nutrient material used in the above examples consisted essentially of alfalfa, barley and molasses with an analysis of about 70, 20 and 10%, respectively. But any suitable animal feed or nutrient material, solid or liquid, may carry the growth promotant substance and the above feed material is exemplary only. In preparing the solid feed material containing the growth promotant, the growth promotant may be intimately mixed or blended with the feed material to produce a premix. An appropriate amount of this premix may then be distributed throughout the entire feed in a feed mixer or blender. Alternatively, the growth promotant substance can be dissolved in a suitable solvent such as, for example, water or ethanol, and the solubilized material mixed with the solid feed, or if a liquid, the growth promotant substance can be mixed with the dry feed to form a mash. In the case of some growth promotants such as, for example, acrolein, the acrolein may be added directly to the drinking water.

The range of effectiveness of the growth promotant substances of this invention depends upon the age and species of the animal being fed. Experiments have shown response from 25 mg. to 175 mg. per animal per day, an especially favorable range for growing lambs. However, greater or lesser amounts of these growth promotants can be employed with considerable success with a range of from about 5 mg. to about 500 mg. per animal per day as satisfactory. In the compositions of this invention, that is, those compositions containing an animal feed, nutrient material or water in combination with one or more of the growth promotants of this invention, the composition may contain from about .0019% to about .0133% of growth promotant with a range of from about .00038% to about .038% most preferred based upon 80 lb. fattening and consuming 2.9 lbs. per day.

The growth promotant substances described herein not only speed up the growth of the animal but also improve the efficiency of feed conversion. This is an important advantage, since it makes the growing process more economical for animal raisers by requiring less feed per pound of weight gain. In addition, these growth promotant substances can be combined with the antibiotics now in use in order to reduce the amount of the more expensive antibiotics needed to possibly minimize the danger of the development of a resistant flora, and to use a material that is not currently employed in clinical medicine.

While in the foregoing specification, this invention has been described in relation to certain specific embodiments thereof and many details have been set forth for purpose of illustration, it will be apparent to those skilled in the art that the invention is susceptible to other embodiments than those set forth and that many of the specific details can be varied widely without departing from the basic concepts of the invention.

I claim as my invention:

1. A composition for promoting the growth of animals comprising as the essential active ingredient therein from about .00038% to about .038% of a compound selected from the group consisting of: (1) an alpha-methylidene alkanal, (2) an acrolein dialiphatic acetal and (3) a beta-alkoxypropionaldehyde, in admixture with an animal feed.

2. A composition for promoting the growth of animals comprising as the essential active ingredient therein from about .00038% to about .038% of an alpha-methylidene alkanal, in admixture with an animal feed.

3. A composition for promoting the growth of animals comprising as the essential active ingredient therein from about .00038% to about .038% of an acrolein dialiphatic acetal, in admixture with an animal feed.

4. A composition for promoting the growth of animals comprising as the essential active ingredient therein from about .00038% to about .038% of a beta-alkoxypropionaldehyde, in admixture with an animal feed.

5. A composition for promoting the growth of animals comprising as the essential active ingredient therein from about .00038% to about .038% of acrolein, in admixture with an animal feed.

6. A composition for promoting the growth of animals comprising as the essential active ingredient therein from about .00038% to about .038% of acrolein dimethyl acetal, in admixture with an animal feed.

7. A composition for promoting the growth of animals comprising as the essential active ingredient therein from about .00038% to about .038% of beta-methoxypropionaldehyde, in admixture with an animal feed.

8. A method for promoting the growth of animals comprising orally administering to said animals about 5–500 mg. per animal per day of a compound selected from the group consisting of: (1) an alpha-methylidene alkanal, (2) an acrolein dialiphatic acetal and (3) a beta-alkoxypropionaldehyde.

9. A method for promoting the growth of animals comprising orally administering to said animals about 5–500 mg. per animal per day of an alpha-methylidene alkanal.

10. A method for promoting the growth of animals comprising orally administering to said animals about 5–500 mg. per animal per day of an acrolein dialiphatic acetal.

11. A method for promoting the growth of animals comprising orally administering to said animals about 5–500 mg. per animal per day of a beta-alkoxypropionaldehyde.

12. A method for promoting the growth of animals comprising orally administering about 5–500 mg. per animal per day of acrolein to said animals.

13. A method for promoting the growth of animals comprising orally administering about 5–500 mg. per animal per day of acrolein dimethyl acetal to said animals 14. A method for promoting the growth of animals comprising orally administering about 5–500 mg. per animal per day of beta-methoxypropionaldehyde to said animals.

References Cited by the Examiner

UNITED STATES PATENTS 3,006,807  10/1961  Legator.
3,031,447  4/1962  Saikachi.

OTHER REFERENCES

Vollrath et al.: Proc. Soc. for Exp. Biol. and Med. 36, February-June 1937, pages 55–8.

A. LOUIS MONACELL, *Primary Examiner.*

ABRAHAM H. WINKELSTEIN, *Examiner.*